Figure 1:
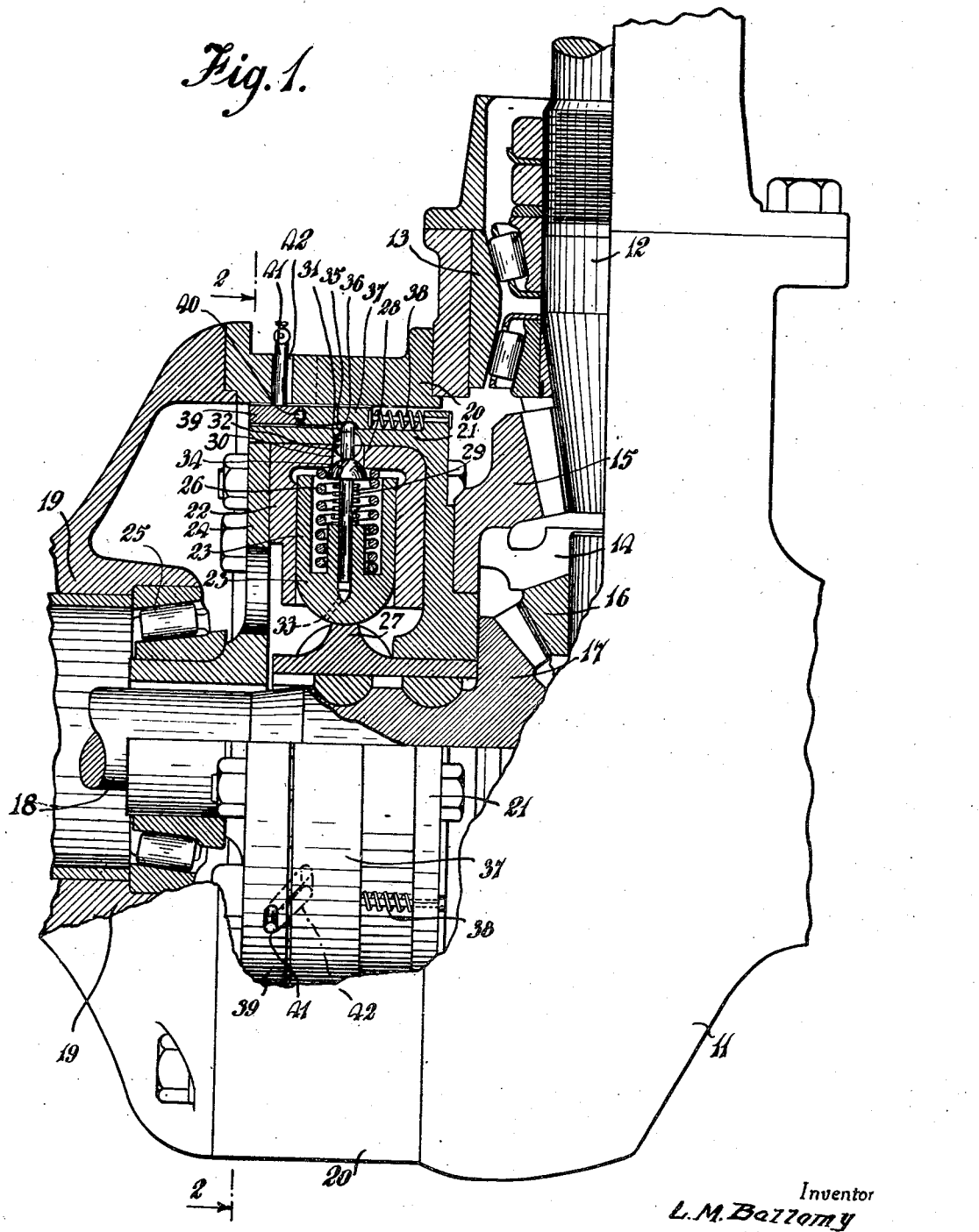

July 9, 1940. L. M. BALLAMY 2,207,310
DIFFERENTIAL GEAR
Filed Jan. 5, 1940 2 Sheets-Sheet 1

Inventor
L. M. Ballamy
by Hume & Davis
Attorneys

July 9, 1940.  L. M. BALLAMY  2,207,310
DIFFERENTIAL GEAR
Filed Jan. 5, 1940  2 Sheets-Sheet 2

Inventor
L. M. Ballamy
by Stevens & Davis
Attorney

Patented July 9, 1940

2,207,310

UNITED STATES PATENT OFFICE 2,207,310

DIFFERENTIAL GEAR

Leslie Mark Ballamy, Caterham-on-Hill, England

Application January 5, 1940, Serial No. 312,596
In Great Britain December 13, 1938

12 Claims. (Cl. 74—315)

This invention relates to differential gears, and more particularly to such differential gears as are used in mechanically driven vehicles to compensate for the different angular velocity of two opposite driven wheels when the vehicle deviates from a straight course. It is well known that such gears have the drawback that where one of the driven wheels is free to rotate, little or no drive is transmitted to the other wheel, so that if for example one driven wheel encounters a slippery surface the vehicle may be unable to proceed under its own power. Proposals have already been made for locking the differential when desired, so that both wheels will be driven as one, or for limiting the extent to which one driven wheel can turn in advance of the other, but such arrangements require some type of manual control, and the second mentioned arrangement, once one wheel has advanced to the limit set has all the drawbacks of the so-called "solid axle."

The present invention has for an object to provide improvements in differential gearing for mechanically driven vehicles which whilst providing all the differential action that is required for such use, shall yet be free from the drawback that if one of a pair of opposite driven wheels is free or freer than the other to rotate a substantial drive shall yet be transmitted to the other wheel. The improved gear according to the invention is, therefore, particularly applicable to mechanically propelled vehicles, although it may be employed with advantage in other circumstances.

In a differential gear in accordance with the invention, there is associated with the cage or planet carrier and one at least of the driven shafts, a pump or dashpot mechanism which becomes operative when there occurs any tendency for substantial rotation of said shaft relative to said cage or planet carrier.

Preferably, such pump or dashpot mechanism comprises one or more cylinders and pistons, or other variable volume devices, which is or are operated by a cam fast on the shaft or upon the cage or planet carrier; the fluid medium employed being the normal lubricating oil supply in the fixed casing of the gear.

For example, the cage or planet carrier may have secured thereto at one side thereof a plurality of cylinders disposed radially therearound with their closed ends outermost, pistons in said cylinders being spring influenced to project from the open inner ends of said cylinders and bear operatively against a can formed on or carried by the corresponding driven shaft. Provision may be made for the easy ingress of oil to such cylinders, and for the restricted egress of oil therefrom necessary for dashpot action, in a variety of ways: for example, the cylinder, or each of them, may have one or more inlet ports for oil formed in the wall thereof intermediately of its length, such port or ports being closed by the movement of the piston towards the closed end of the cylinder, and the restricted outlet for oil may take the form of smaller ports formed in the cylinder wall nearer its closed end or in said closed end and/or in the piston itself. Again, such a cylinder may be provided with an automatic inlet valve which opens against spring influence when the piston moves away from the closed end of the cylinder. Yet again, a valve may be carried actually by the piston, e. g. coaxially thereof, the valve being of mushroom type with its stem slidable in a guide formed within the piston and its head being urged against a seating at the inner end of a port in the outer closed end of the cylinder by a light spring. In such a case, the stem of the valve may be continued through the port in the closed end of the cylinder beyond which means may be provided for shifting and holding the valve clear of its seating, and thus rendering the dashpot mechanism inoperative.

Figure 3:
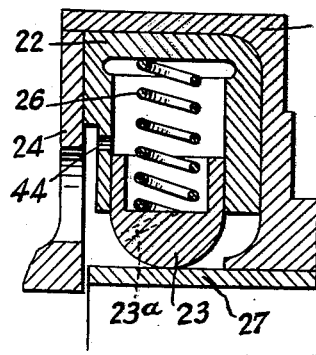
Figure 4:
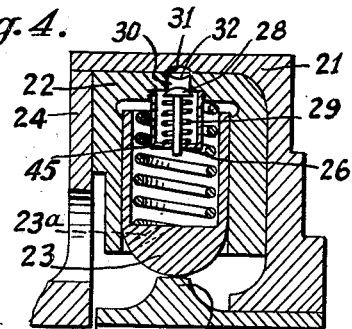
Figure 2:
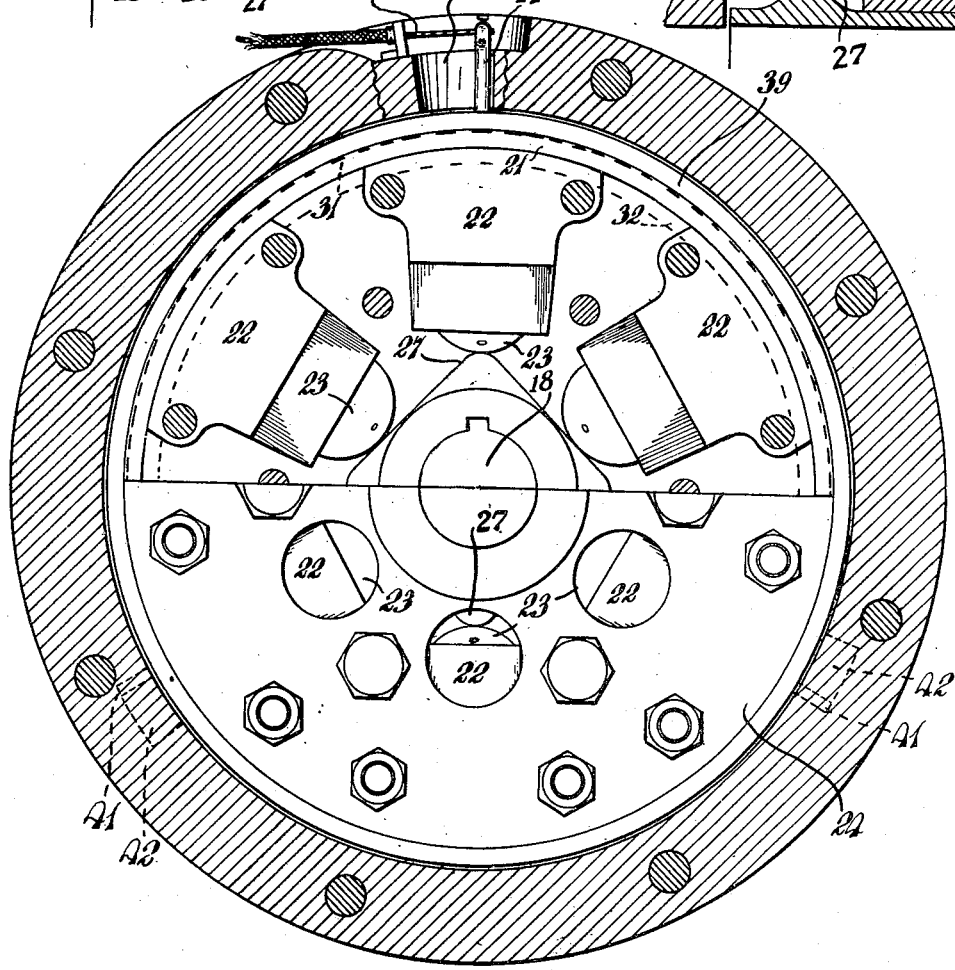

A gear according to one form of the invention is illustrated by Figures 1 and 2 of the accompanying diagrammatic drawings; Figure 1 being a part-sectional plan view and Figure 2 being a sectional view on the line 2—2 of Figure 1, parts being broken away for clearness;

Figures 3 and 4 are sectional detail views of modifications.

The gear shown in Figures 1 and 2 is that of a standard back axle for a road vehicle to which the dashpot mechanism of the invention has been added with a minimum of modification. The gear has a fixed casing indicated generally at 11, and according to normal practice the driving shaft indicated at 12 is journalled at 13 in the casing 11 and drives the cage or planet carrier 14 of the gear through the medium of a crown wheel 15. Part of one of the planet wheels is indicated at 16, and one of the driven wheels with which this meshes is indicated at 17; the corresponding driven shaft being indicated at 18. As usual, this driven shaft is housed within a fixed casing 19 bolted to the casing 11, but in order to accommodate the dashpot mechanism of the present invention the tubular portion of this casing 19 is shortened (not shown) and there is interposed between said casing 19 and the casing 11 an annular distance piece 20. The center part of the crown wheel 15, which is formed integrally with the cage 14 is cut away and there is fitted thereto a dished plate 21 within which the dashpot mechanism of the invention is mounted. This mechanism comprises a number of radially disposed cylinders 22, each with a piston 23 therein, which together with an apertured cover plate 24 carrying one of the bearings 25 for the cage 14 and crown wheel 15 are bolted in position.

As will be seen, the cylinders 22 are open at their inner ends and each piston has a deep skirt within which is disposed a coiled spring 26 causing it to project from the corresponding cylinder. In this way, each piston 23 is maintained in co-operation with a cam 27 keyed to the driven shaft 18. Within the skirt, each piston is formed with a central bored boss which constitutes a guide for a mushroom type valve 28, the stem of which is slidable in said bore, a light coiled spring 29 urging the valve against its seating around the edge of a bore 30 formed in the closed end of the cylinder. This bore 30 communicates with a groove 31 formed around the inner periphery of the dished plate 21; each of the cylinders being formed with a complementary groove 32, so that the normal lubricating oil in the casing 11 may reach the bores 30 of the cylinders 22 by way of the apertures in the plate 24. To avoid the entrapping of air or oil within the piston below the end of the stem of the valve 28 the piston is formed with a small bore 33.

In operation, so long as no rotation of the shaft 18 relative to the cage 14, and therefore so long as no rotation of the cam 27 relative to the pistons 23 and cylinders 22, takes place, said pistons 23 will remain stationary in their respective cylinders 22. Immediately, however, such relative rotation does occur, said pistons 23 will move; a piston at the top of its stroke as shown in Figure 1 moving downwardly, and the resultant reduction of pressure within the corresponding cylinder opening the valve 28 against its spring 29, and oil consequently flowing from the groove 31 by way of the bore 32 into the cylinder. When, however, a piston is at the bottom of its stroke, it will proceed to move upwardly, thus compressing oil within its cylinder. The desired dashpot action is afforded by forming the surface of the valve 28 with one or more small grooves 34, by way of which oil from the cylinder can escape under the resulting pressure. As will be seen, according to the size of these grooves 34, a greater or less resistance to the rotation of the shaft 18 relative to the cage 14, and therefore relative to the other driven shaft (not shown), can be provided.

In the form shown, means are provided whereby the dashpot action can be eliminated at will. For this purpose, each valve 28 has a stem 35 extending through the bore 30 in the closed end of the corresponding cylinder and through an aperture formed for the purpose in the dished plate 21 into a circumferential groove 36 extending around a ring 37 slidable against the influence of springs 38 on said dished plate 21. For shifting this ring 37 against the springs 38 a second ring 39, also slidable on the dished plate 21, co-operates with said ring 37 through the medium of balls 40 and from this latter ring 39 there extend radially three pins 41 which extend into inclined slots 42 in the distance piece 20 as shown in broken lines in Figure 2. One only of these slots and the corresponding pin 41 extend completely through the annular distance piece 20, and this particular pin 41 is connected with a control wire 43 whereby the ring 39 may be rotated through a small distance on the dished plate 21. When this is done, the pins 41 will ride along the inclined slots 42, and thus the ring 39 will be shifted to the right as shown in Figure 1, and in so doing will shift the ring 37 in the same direction against the influence of springs 38. This movement of the latter ring 37, however, will cause the groove 36 thereof to co-operate cam-fashion with the outer ends of the stems 35 of the valves 28 to shift the latter and maintain them clear of their seats, thus allowing free ingress and egress of oil to the cylinders 22 and rendering the mechanism inoperative.

In the simple case, illustrated in Figure 3, where it is not desired to be able to render the dashpot mechanism inoperative at will, the arrangement is essentially similar to that shown in Figures 1 and 2, but each cylinder 22 is completely closed at its outer end and in place of the valve 28 the cylinder wall is formed with an inlet port 44 so located as to be closed by the piston 23 when it moves from the position in which it is shown further from the closed end of the cylinder. The restricted outlet for dashpot action may be provided by forming a small bore 23a in the piston 23 or by the clearance between the piston and cylinder.

In the case of the modification shown in Figure 4, it is also assumed that it is not required to render the dashpot mechanism inoperative at will. The arrangement here is also essentially similar to that of Figures 1 and 2 but the valve 28, which has no stem 35 extending outwardly therefrom, is guided by an openwork cage 45 screwed into the outer end of the cylinder 22 and which serves also, instead of the piston 23, as an abutment for the spring 29. It will be apparent that this cage 45 for guiding the valve 28 could be employed in the form shown in Figures 1 and 2.

In operation, piston 23 moves outwardly in response to the action of spring 26 when cam 27 moves relative to the piston. The reduction of pressure within the cylinder causes valve 28 to be unseated against the action of spring 29 thereby admitting fluid to the cylinder. When the piston moves in the opposite direction the valve will be closed and a dashpot action is effected as in conjunction with the modification disclosed in Figure 3 by the employment of a small bore such as 23a.

What I claim is:

1. A differential gear comprising a rotary cage, planet wheels journalled on said cage, and driven wheels and driven shafts co-axial with one another and with said cage, a plurality of cylinders on said cage disposed radially therearound and surrounding a driven shaft, pistons in said cylinders, a cam on said driven shaft where it is surrounded by said cylinders, and springs in said cylinders urging the pistons into operative co-operation with said cam.

2. A differential gear comprising a rotary cage, planet wheels journalled on said cage and driven wheels and driven shafts co-axial with one another and with said cage, bearings for said cage one at each side thereof coaxial with said shafts one of which latter extends through each of said bearings, respectively, a plurality of cylinders on said cage disposed radially therearound between the planet wheels and the bearing for the cage at one side thereof and surrounding the corresponding driven shaft, a cam on said driven shaft adjacent to said bearing, and pistons and springs in said cylinders, said springs urging said pistons to bear operatively upon said cam.

3. A differential gear comprising a rotary cage, planet wheels journalled on said cage, and driven wheels and driven shafts co-axial with one another and with said cage, and dash-pot mechanism associated with said cage and one at least of said driven shafts to be operated by rotation of said shaft relative to said cage, said dash-pot mechanism comprising a series of cylinders surrounding a driven shaft, pistons in said cylinders, a cam surrounding said driven shaft, and springs in said cylinders urging said pistons to bear operatively on said cam.

4. A differential gear comprising a rotary cage, planet wheels journalled on said cage, and driven wheels and driven shafts co-axial with one another and with said cage, and dash-pot mechanism associated with said cage and one at least of said driven shafts to be operated by rotation of said shaft relative to said cage, said dash-pot mechanism comprising a series of cylinders surrounding a driven shaft, pistons in said cylinders, a cam surrounding said driven shaft, and springs in said cylinders urging said pistons to bear operatively on said cam, a lateral inlet port in each cylinder being closed and opened by the piston therein.

5. A differential gear comprising a rotary cage, planet wheels journalled on said cage, and driven wheels and driven shafts co-axial with one another and with said cage, and dash pot mechanism associated with said cage and one at least of said driven shafts to be operated by rotation of said shaft relative to said cage, said dash-pot mechanism comprising a series of cylinders surrounding a driven shaft, pistons in said cylinders, a cam surrounding said driven shaft, and springs in said cylinders urging said pistons to bear operatively on said cam, each cylinder having an inlet port controlled by a spring loaded inlet valve.

6. A differential gear comprising a rotary cage, planet wheels journalled on said cage, and driven wheels and driven shafts co-axial with one another and with said cage, and dashpot mechanism associated with said cage and one at least of said driven shafts to be operated by rotation of said shaft relative to said cage, said dashpot mechanism comprising a series of cylinders surrounding a driven shaft, pistons in said cylinders, a cam surrounding said driven shaft, and springs in said cylinders urging said pistons to bear operatively on said cam, each cylinder having an inlet port formed in one end thereof, and each piston carries a spring loaded valve and means for guiding it for movement to open and close said inlet port.

7. A differential gear comprising a rotary cage, planet wheels journalled on said cage, and driven wheels and driven shafts co-axial with one another and with said cage, and dashpot mechanism associated with said cage and one at least of said driven shafts to be operated by rotation of said shaft relative to said cage, said dashpot mechanism comprising a series of cylinders surrounding a driven shaft, pistons in said cylinders, a cam surrounding said driven shaft, and springs in said cylinders urging said pistons to bear operatively on said cam, each cylinder having an inlet port formed in one end thereof, and each piston carries a spring loaded valve and means for guiding it for movement to open and close said inlet port, said valve being of mushroom type with its stem slidable in a guide formed within the piston co-axially thereof, a coiled spring bearing at its ends against the piston and against the underside of the valve head, respectively.

8. A differential gear comprising a rotary cage, planet wheels journalled on said cage, and driven wheels and driven shafts co-axial with one another and with said cage, and dashpot mechanism associated with said cage and one at least of said driven shafts to be operated by rotation of said shaft relative to said cage, said dashpot mechanism comprising a series of cylinders surrounding a driven shaft, pistons in said cylinders, a cam surrounding said driven shaft, and springs in said cylinders urging said pistons to bear operatively on said cam, each cylinder having an inlet port controlled by a spring loaded inlet valve, means being provided for holding said valves open against the spring loading.

9. A differential gear comprising a rotary cage, planet wheels journalled on said cage, and driven wheels and driven shafts co-axial with one another and with said cage, and dashpot mechanism associated with said cage and one at least of said driven shafts to be operated by rotation of said shaft relative to said cage, said dashpot mechanism comprising a series of cylinders surrounding a driven shaft, pistons in said cylinders, a cam surrounding said driven shaft, and springs in said cylinders urging said pistons to bear operatively on said cam, each cylinder having an inlet port controlled by a spring loaded inlet valve, each valve having a stem extending freely through the corresponding inlet port, and means co-operating with such stems and operable at will being provided for holding said valves open against the spring loading.

10. A differential gear comprising a rotary cage, planet wheels journalled on said cage, and driven wheels and driven shafts co-axial with one another and with said cage, and dashpot mechanism associated with said cage and one at least of said driven shafts to be operated by rotation of said shaft relative to said cage, said dashpot mechanism comprising a series of cylinders surrounding a driven shaft, pistons in said cylinders, a cam surrounding said driven shaft, and springs in said cylinders urging said pistons to bear operatively on said cam, each cylinder having an inlet port formed in one end thereof, and each piston carries a spring loaded valve and means for guiding it for movement to open and close said inlet port, said valve being of mushroom type with its stem slidable in a guide formed within the piston co-axially thereof, a coiled spring bearing at its ends against the piston and against the underside of the valve head, respectively, each valve having also a stem extending freely through the corresponding inlet port, and means cooperating with such stems and operable at will being provided for holding said valves open against the spring loading.

11. A differential gear comprising a rotary cage, planet wheels journalled on said cage, and driven wheels and driven shafts co-axial with one another and with said cage, and dashpot mechanism associated with said cage and one at least of said driven shafts to be operated by rotation of said shaft relative to said cage, said dashpot mechanism comprising a series of cylinders surrounding a driven shaft, pistons in said cylinders, a cam surrounding said driven shaft, and springs in said cylinders urging said pistons to bear operatively on said cam, each cylinder having an inlet port controlled by a spring loaded inlet valve, each inlet valve when closed affording a restricted outlet for dashpot action.

12. A differential gear comprising a rotary cage, planet wheels journalled on said cage, and driven wheels and driven shafts co-axial with one another and with said cage, and dashpot mechanism associated with said cage and one at least of said driven shafts to be operated by rotation of said shaft relative to said cage, said dashpot mechanism comprising a series of cylinders surrounding a driven shaft, pistons in said cylinders, a cam surrounding said driven shaft, and springs in said cylinders urging said pistons to bear operatively on said cam, each cylinder having an inlet port controlled by a spring loaded inlet valve each inlet valve being grooved across its face to afford when closed a restricted outlet from the corresponding cylinder.

LESLIE MARK BALLAMY.